(12) United States Patent
Yamamoto et al.

(10) Patent No.: US 11,754,243 B2
(45) Date of Patent: Sep. 12, 2023

(54) AUTOMOTIVE LAMP

(71) Applicant: KOITO MANUFACTURING CO., LTD., Tokyo (JP)

(72) Inventors: Norimasa Yamamoto, Shizuoka (JP); Hiroya Koizumi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/867,894

(22) Filed: Jul. 19, 2022

(65) Prior Publication Data

US 2022/0349544 A1 Nov. 3, 2022

Related U.S. Application Data

(63) Continuation of application No. PCT/JP2021/000854, filed on Jan. 13, 2021.

(30) Foreign Application Priority Data

Jan. 21, 2020 (JP) .................... 2020-007366

(51) Int. Cl.
*F21S 41/24* (2018.01)
*F21S 41/25* (2018.01)
(Continued)

(52) U.S. Cl.
CPC ............ *F21S 41/24* (2018.01); *F21S 41/125* (2018.01); *F21S 41/25* (2018.01); *F21S 41/663* (2018.01);
(Continued)

(58) Field of Classification Search
None
See application file for complete search history.

(56) References Cited

U.S. PATENT DOCUMENTS 10,168,017 B2 1/2019 Tokieda et al.
10,352,524 B1 * 7/2019 Hong .................... B29C 45/16
(Continued)

FOREIGN PATENT DOCUMENTS

CN 108266694 A 7/2018
DE 4129094 A1 3/1993
(Continued)

OTHER PUBLICATIONS

International Preliminary Report on Patentability (PCT/IPEA/409) issued in corresponding International Patent Application No. PCT/JP2021/000854 dated Jul. 26, 2022. (12 pages).
(Continued)

*Primary Examiner* — Elmito Breval
(74) *Attorney, Agent, or Firm* — BUCHANAN INGERSOLL & ROONEY PC

(57) ABSTRACT

Multiple light sources are arranged in an array. A light guide member receives light emitted from the multiple light sources on its back face, and outputs the light thus received from its front face. The light guide member has a base portion such that its back face faces the multiple light sources and such that it extends in the array direction of the multiple light sources. Multiple back-face protrusions and multiple front-face protrusions are formed such that they protrude from the back face and the front face of the base portion. The front-face protrusion has multiple continuous faces in the circumferential direction along the front face of the base portion.

12 Claims, 14 Drawing Sheets

(51) Int. Cl.
  *F21S 41/663* (2018.01)
  *F21S 43/249* (2018.01)
  *F21S 43/10* (2018.01)
  *F21S 41/125* (2018.01)
  *F21S 43/20* (2018.01)

(52) U.S. Cl.
  CPC .............. *F21S 43/10* (2018.01); *F21S 43/249* (2018.01); *F21S 43/26* (2018.01)

(56) References Cited

U.S. PATENT DOCUMENTS

| | | |
|---|---|---|
| 2009/0185389 A1 | 7/2009 | Tessnow et al. |
| 2014/0140088 A1 | 5/2014 | Griebel |
| 2015/0277020 A1 | 10/2015 | Chen |
| 2015/0316227 A1 | 11/2015 | Sahlin et al. |
| 2019/0086053 A1 | 3/2019 | Asakawa et al. |
| 2020/0017021 A1 * | 1/2020 | Raciniewski ........ B60Q 1/0094 |

FOREIGN PATENT DOCUMENTS

| | | | |
|---|---|---|---|
| DE | 102009058457 A1 * | 6/2011 | ........ B60Q 1/0041 |
| DE | 202019003710 U1 | 10/2019 | |
| EP | 1176360 A2 | 1/2002 | |
| EP | 2824385 A1 | 1/2015 | |
| EP | 3258166 A1 | 12/2017 | |
| JP | 2012248358 A | 12/2012 | |
| JP | 2015018668 A | 1/2015 | |
| JP | 2015201278 A | 11/2015 | |
| JP | 2017174656 A | 9/2017 | |
| JP | 2017224445 A | 12/2017 | |
| JP | 2018092753 A | 6/2018 | |
| JP | 2020004960 A | 1/2020 | |
| JP | 2020009656 A | 1/2020 | |
| WO | 2014002480 A1 | 1/2014 | |
| WO | 2019035433 A1 | 2/2019 | |

OTHER PUBLICATIONS

International Search Report (PCT/ISA/210) with translation dated Mar. 23, 2021, by the Japan Patent Office as the International Searching Authority for International Application No. PCT/JP2021/000854. (6 pages).

Extended European Search Report dated Jun. 23, 2023, issued in corresponding European Application No. 21744041.1. (12 pages).

* cited by examiner

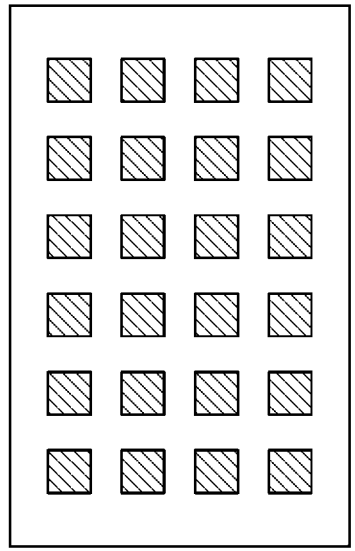
FIG. 2A
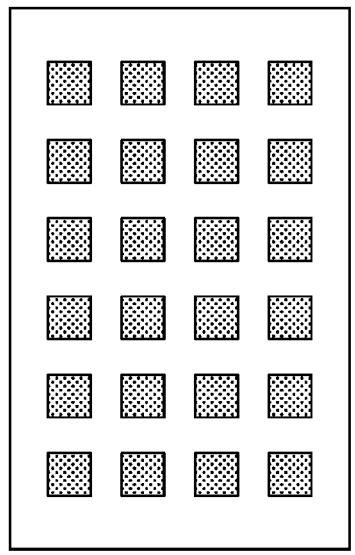
FIG. 2B
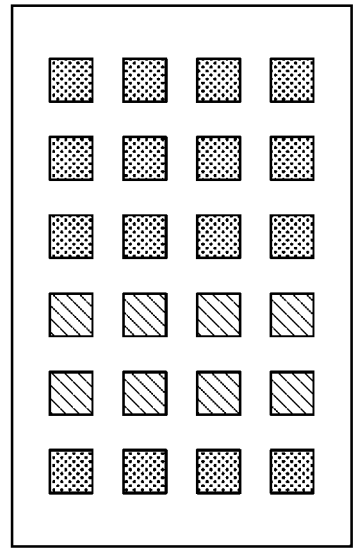
FIG. 2C
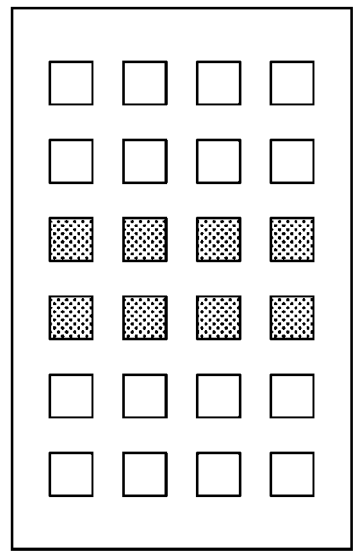
FIG. 2D

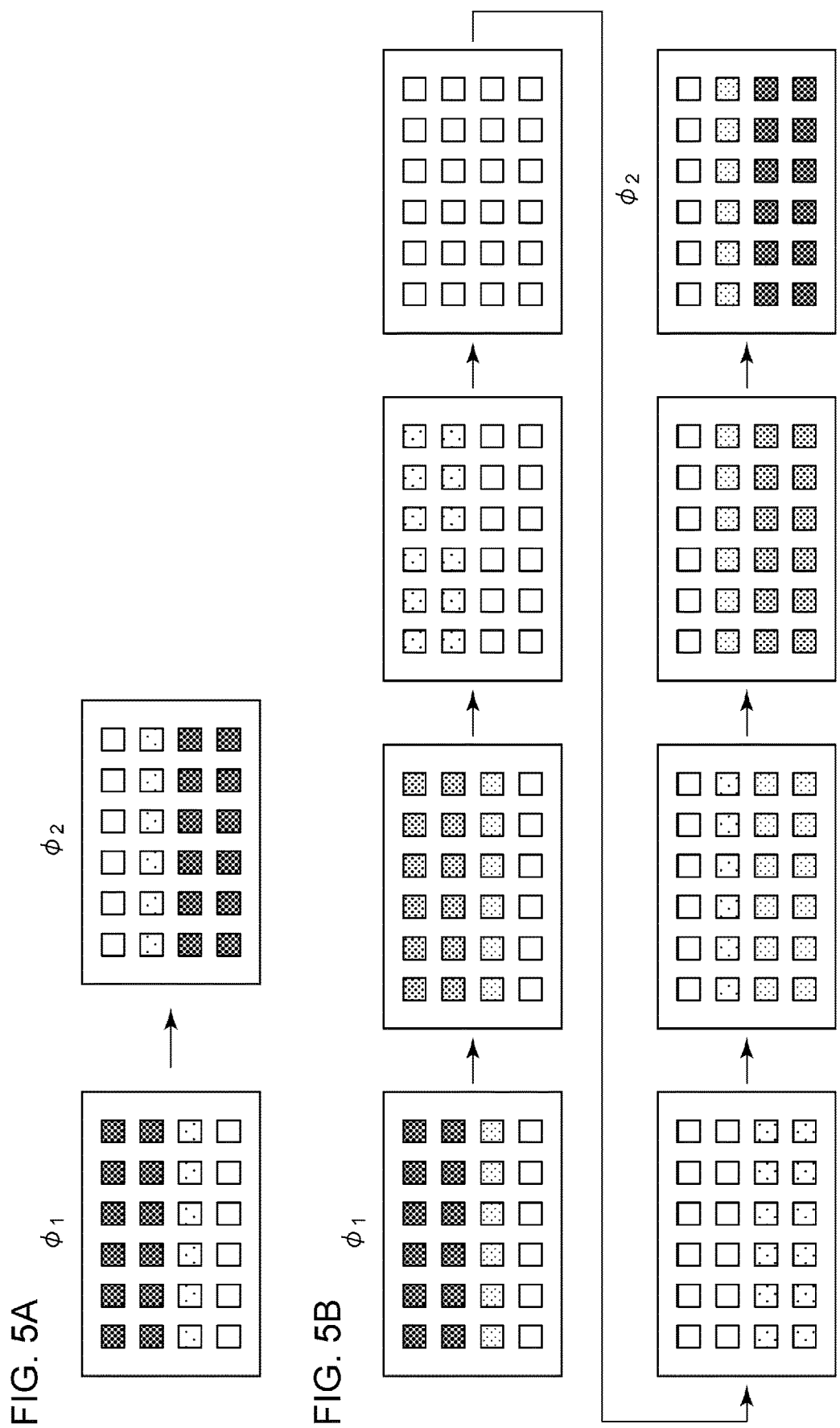

AUTOMOTIVE LAMP

BACKGROUND

1. Technical Field

The present disclosure relates to an automotive lamp employed in automobile or the like.

2. Description of the Related Art

As a power supply for an automotive lamp, instead of conventional light bulbs (bulbs) such as incandescent light bulbs or the like, the use of semiconductor light sources such as light-emitting diodes, semiconductor lasers, etc., has been advancing. As compared with light bulbs, such semiconductor light sources have many advantages such as greater variation of design provided by various kinds of combinations with light guiding members, power saving, and so forth.

In particular, in recent years, in addition to functions necessary for driving an automobile, such automotive lamps are required to have an additional function of providing improved added value of an automobile, such as a welcome lamp.

SUMMARY

The present disclosure has been made in view of such a situation.

An embodiment of the present disclosure relates to an automotive lamp. The automotive lamp includes: a light guide unit; multiple first light-emitting units arranged along a first end face of the light guide unit, and each including a first light source structured to emit light in a first color and a second light source structured to emit light in a second color that differs from the first color; and a controller structured to control the multiple first light-emitting units.

It should be noted that any combination of the components described above or any component or any manifestation of the present disclosure may be mutually substituted between a method, apparatus, system, and so forth, which are also effective as an embodiment of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A through 2D are diagrams each showing an example of light emission provided by the automotive lamp;

FIGS. 5A and 5B are diagrams for explaining the movement of the light-emitting region in the Y direction;

DETAILED DESCRIPTION

Outline of Embodiments

Figure 1:
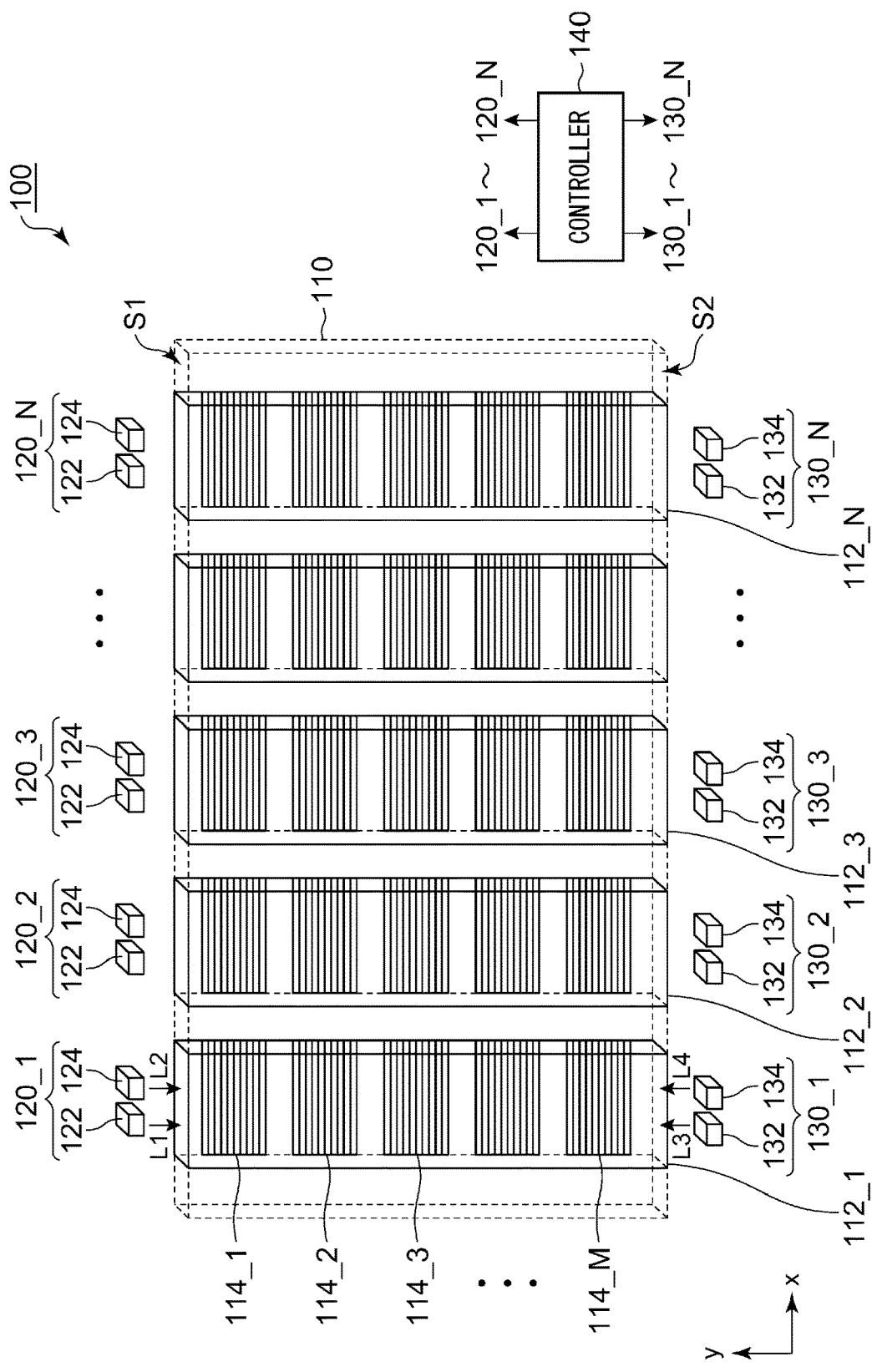
FIG. 1 is a diagram showing an automotive lamp according to an embodiment.

Description will be made regarding an outline of several example embodiments of the present disclosure. In this outline, some concepts of one or more embodiments will be described in a simplified form as a prelude to the more detailed description that is presented later in order to provide a basic understanding of such embodiments. Accordingly, the outline is by no means intended to restrict the scope of the present invention or the present disclosure. Furthermore, this outline is not an extensive overview of all conceivable embodiments, and is by no means intended to restrict essential elements of the embodiments. In some cases, for convenience, the term "one embodiment" may be used herein to refer to a single embodiment (example or modification) or multiple embodiments (examples or modifications) disclosed in the present specification.

An automotive lamp according to an embodiment includes: a light guide unit; multiple first light-emitting units arranged along a first end face of the light guide unit, and each including a first light source structured to emit light in a first color and a second light source structured to emit light in a second color that differs from the first color; and a controller structured to control the multiple first light-emitting units.

With such an arrangement, this is capable of switching the color of light to be emitted. Also, this is capable of controlling the size and the position of a light-emitting portion of the guide light unit.

In an embodiment, the automotive lamp may further include multiple second light-emitting units arranged along a second end face of the light guide unit on a side opposite to the first end face thereof, and each including a third light source structure to emit light in the first color and a fourth light source structured to emit in the second color. This allows unevenness in luminance to be reduced in the light-guiding direction. Furthermore, this allows the position and the size of the light-emitting portion to be controlled in the light-guiding direction.

With an embodiment, the light guide unit may include multiple light guide members that correspond to the multiple first light-emitting units and the multiple second light-emitting units, and that are each structured to extend from a corresponding one from among the multiple first light-emitting units toward a corresponding one from among the multiple second light-emitting units. This allows the light to be confined in a corresponding light guide unit for each pair of the first light-emitting unit and the second light-emitting unit. This allows the boundary to be clearly defined between the light-emitting portions defined for each light-emitting unit pair.

In an embodiment, multiple discrete steps may be formed in the multiple light guide members along a direction of extension thereof. This allows the multiple light-emitting portions to be arranged in a matrix.

In an embodiment, the light guide unit may be structured as a single light guide panel. Also, a collimating optical system may be provided to or formed on the first end face of the light guide panel for each of the first light-emitting units. Also, a collimating optical system may be provided to or formed on the second end face of the light guide panel for each of the second light-emitting units.

In an embodiment, multiple discrete steps may be formed in the light guide panel in the light wave-guiding direction. Furthermore, the multiple steps may be formed in a discrete manner in a direction in which the multiple first light-emitting units are arrayed.

In an embodiment, the controller controls an operation such that (i) the first light sources included in the multiple first light-emitting units turned on, and the third light sources included in the multiple second light-emitting units are turned on, (ii) luminance of the first light sources included in the multiple light-emitting units is gradually reduced with time, and at the same time, luminance of the second light sources is gradually increased with time, and (iii) luminance of the third light sources included in the multiple second light-emitting units is gradually reduced with time, and at the same time, luminance of the fourth light sources is gradually increased with time.

With this, in a case in which the first-color light-emitting state is to be switched to the second-color light-emitting state, this arrangement is capable of changing the light-emitting state with time along the light wave-guiding direction.

In an embodiment, one from among the first color and the second color may be turquoise. With this, the automotive lamp can be employed as a lamp that indicates that the vehicle is traveling in an autonomous driving mode.

In an embodiment, one from among the first color and the second color may be white. With this, the automotive lamp can be employed as a Daytime Running Lamp (DRL) or a position lamp (clearance lamp). Also, the automotive lamp can be employed as a welcome lamp.

In an embodiment, one from among the first color and the second color may be red or amber. This allows the automotive lamp to be employed as a stop lamp or turn lamp.

In an embodiment, the automotive lamp may be mounted on a front grille of a vehicle. Also, the automotive lamp may be mounted on a headlamp or a rear combination lamp. Also, the automotive lamp may be configured as an interior lamp.

EMBODIMENTS

Description will be made below regarding the present disclosure with reference to the drawings. In each drawing, the same or similar components, members, and processes are denoted by the same reference numerals, and redundant description thereof will be omitted as appropriate. The embodiments have been described for exemplary purposes only, and are by no means intended to restrict the present disclosure. Also, it is not necessarily essential for the present disclosure that all the features or a combination thereof be provided as described in the embodiments.

Embodiment 1

FIG. 1 is a diagram showing an automotive lamp 100 according to an embodiment. The automotive lamp 100 includes a light guide unit 110, multiple (N) first light-emitting units 120_1 through 120_N, multiple (N) second light-emitting units 130_1 through 130_N, and a controller 140.

The multiple first light-emitting units 120_1 through 120_N are arranged along a first end face S1 of the light guide unit 110. Each first light-emitting unit 120 includes a first light source 122 configured to emit light in a first color and a second light source 124 configured to emit light in a second color that differs from the first color. As the first light source 122 and the second light source 124, a semiconductor light source such as a light-emitting diode (LED), laser diode (LD), organic EL (Electro Luminescence) or the like can be employed. In addition to the first light source 122 and the second light source 124, the first light-emitting unit 120 includes a lighting circuit (driving circuit) for the light sources. The configuration of the lighting circuit may preferably be designed according to the kind of the light source.

The multiple second light-emitting units 130_1 through 130_N are arranged in the X direction along a second end face S2 of the light guide unit 110 that is opposite to the first end face S1 thereof. In the same manner as in the first light-emitting units 120, each second light-emitting unit 130 includes a third light source 132 configured to emit light in the first color and a fourth light source 134 configured to emit light in the second color.

Each first light-emitting unit 120 is positioned such that the output light L1 and L2 from the first light source 122 and the second light source 124 is to be incident to the first end face S1 of the light guide unit 110. Similarly, each second light-emitting unit 130 is positioned such that the output light L3 and L4 from the third light source 132 and the fourth light source 134 are to be incident to the second end face S2 of the light guide unit 110.

The output light L1 and L2 of the first light source 122 and the second light source 124 of each first light-emitting unit 120 is wave-guided through the interior of the light guide unit 110 in a direction (Y direction) that is approximately orthogonal to the first end face S1. The output light L3 and L4 of the third light source 132 and the fourth light source 134 of each second light-emitting unit 130 is wave-guided through the interior of the light guide unit 110 in a direction (Y direction) that is approximately orthogonal to the second end face S2 and that is the reverse of that in which the light L1 and L2 is wave-guided.

The first color and the second color are not restricted in particular. Rather, the first color and the second color may preferably be determined according to the usage of the automotive lamp 100. For example, white may be employed as the first color, and turquoise may be employed as the second color. Description will be made in the present embodiment assuming that the first light source 122 and the second light source 124 included in each first light-emitting unit 120 are turned on and off in a complementary manner. Similarly, description will be made assuming that the third light source 132 and the fourth light source 134 included in each second light-emitting unit 130 are turned on and off in a complementary manner.

The controller 140 controls the multiple first light-emitting units 120_1 through 120_N and the multiple second light-emitting units 130_1 through 130_N. Specifically, the controller 140 is configured to be capable of independently controlling the on state, off state, and light amount of each of the multiple light sources 122, 124, 132, and 134.

In the present embodiment, the light guide unit 110 includes N light guide members 112_1 through 112_N. The N light guide members 112_1 through 112_N are associated with the N first light-emitting units 120 and the N second light-emitting units 130. The i-th light guide member 112_*i* guides the output light of the corresponding first light-emitting unit 120_*i* and the output light of the corresponding second light-emitting unit 130_*i*. In other words, the i-th light guide member 112_*i* is arranged such that it extends from the corresponding first light-emitting unit 120_*i* toward the corresponding second light-emitting unit 130_*i*.

The N light guide members 112_1 through 112_N are each configured to have M multiple discrete steps (rough faces or lens arrays) 114_1 through 114_M along its extending direction (Y direction). In the example shown in FIG. 1, the same number M of steps, i.e., five steps, are formed for each of all the light guide members 112. Also, there may be a difference in the number M of steps between the light guide members 112.

In the automotive lamp 100 shown in FIG. 1, the multiple steps 114 are arranged in a matrix of M rows and N columns. Each step functions as an independent light-emitting region.

The above is the configuration of the automotive lamp 100. Next, description will be made regarding the operation thereof.

FIGS. 2A through 2D are diagrams each showing an example of light emission of the automotive lamp 100. Description will be made below regarding an example in which M=4 and N=6.

FIG. 2A shows an example in which all the light-emitting regions in the M rows and N columns are turned on in the first color. The controller 140 controls all the first light-emitting units 120 such that the first light source 122 is set to the turned-on state, and the second light source 124 is set to the turned-off state. Furthermore, the controller 140 controls all the second light-emitting units 130 such that the third light source 132 is set to the turned-on state, and the fourth light source 134 is set to the turned-off state.

FIG. 2B shows an example in which all the light-emitting regions in the M rows and N columns are turned on in the second color. The controller 140 controls all the first light-emitting units 120 such that the second light source 124 is set to the turned-on state, and the first light source 122 is set to the turned-off state. Furthermore, the controller 140 controls all the second light-emitting units 130 such that the fourth light source 134 is set to the turned-on state, and the third light source 132 is set to the turned-off state.

FIG. 2C shows an example in which a part of the columns (third column and fourth column) is turned on in the first color. The controller 140 controls the third column and the fourth column so as to set the first light sources 122 and the third light sources 132 to the turned-on state and the second light sources 124 and the fourth light sources 134 to the turned-off state. The other light-emitting units, i.e., the first, second, fifth, and sixth column light-emitting units 120_1, 120_2, 120_5, 120_6, 130_1, 130_2, 130_5, and 130_6 are set to the turned-off state.

Similarly, from among the N columns, the light-emitting regions of a part of the N columns may be turned on in the second color.

FIG. 2D shows an example in which a part of the columns (first column and fourth through sixth columns) are turned on in the first color. The light-emitting regions of the other columns (second and third columns) are turned on in the second color. The controller 140 controls the first column and the fourth through the sixth columns so as to set the first light sources 122 and the third light sources 132 to the turned-on state, and to set the second light sources 124 and the fourth light sources 134 to the turned-off state. Furthermore, the controller 140 controls the third and fourth columns so as to set the first light sources 122 and the third light sources 132 to the turned-off state, and to set the second light sources 124 and the fourth light sources 134 to the turned-on state.

As described above, with the automotive lamp 100, this is capable of independently controlling the states (color, turned-on/turned-off state) of the multiple light-emitting regions for each column. In the following description, a combination of the states of the multiple light-emitting regions will be referred to as a "lighting pattern" hereafter.

Figure 3A:
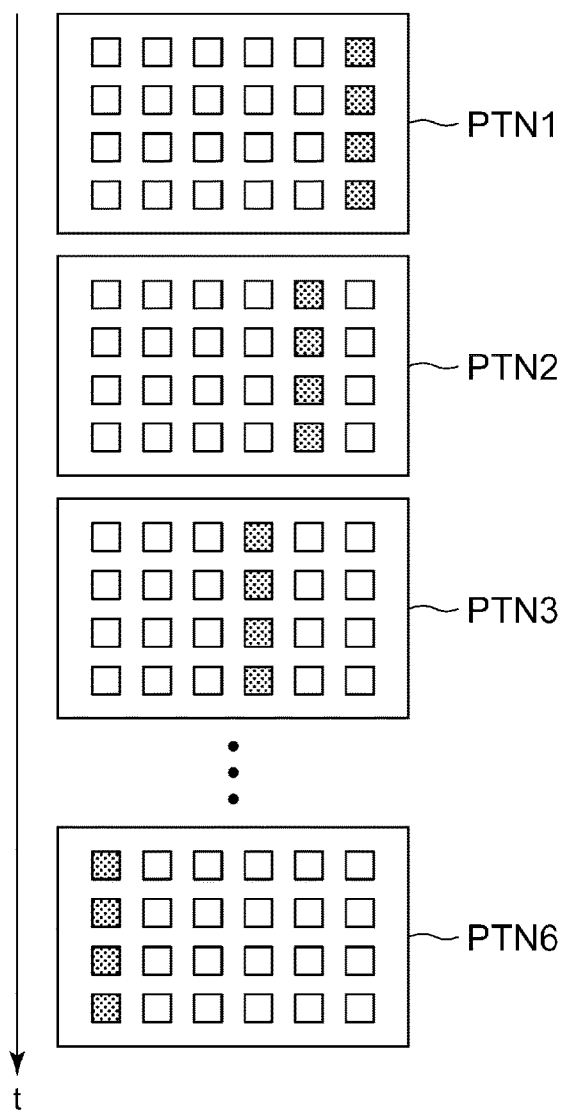
FIGS. 3A and 3B are diagrams for explaining an example of transition of the lighting pattern provided by the automotive lamp.
Figure 3B:
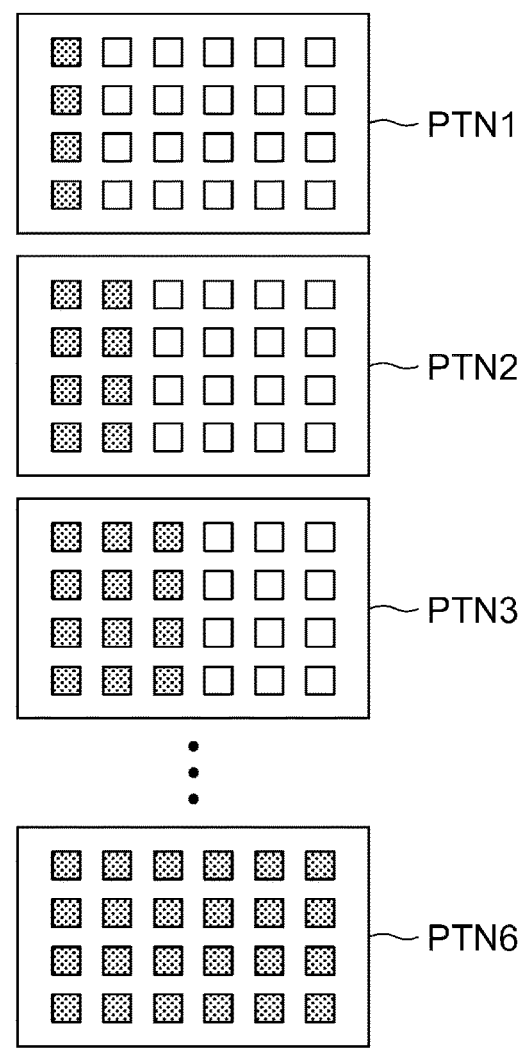

By changing the lighting pattern with time, the automotive lamp 100 is capable of providing animation (movement). FIGS. 3A and 3B are diagrams for explaining examples of transition of the lighting pattern provided by the automotive lamp 100.

FIG. 3A shows an example in which the light-emitting region of the first color moves from the right to left in the drawing. FIG. 3B shows an example of sequential lighting in which the light-emitting region is sequentially turned on from the leftmost column.

Figure 4A:
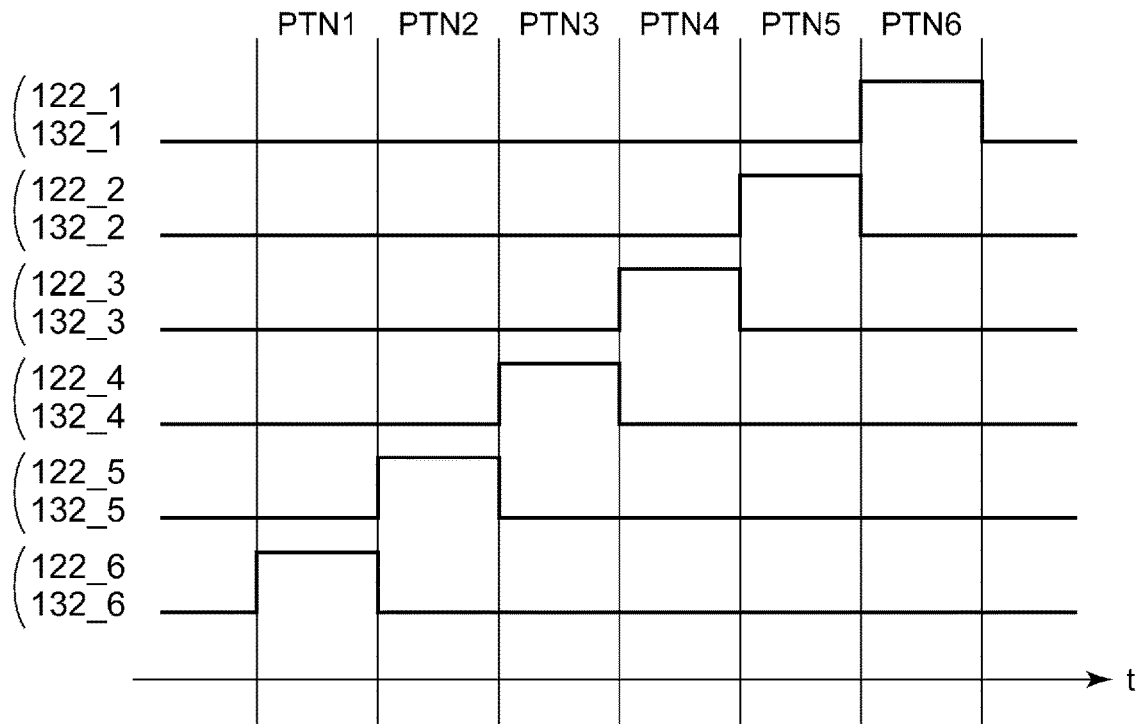
FIGS. 4A and 4B are time charts that correspond to transitions shown in FIGS. 3A and 3B.
Figure 4B:
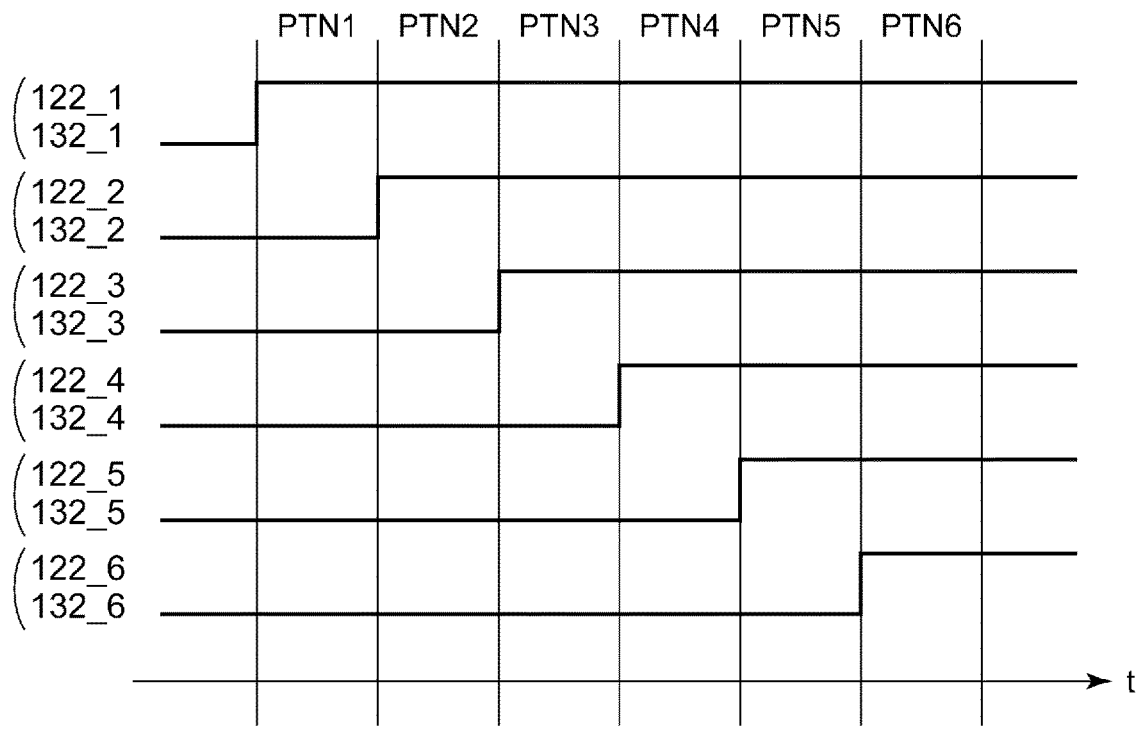

FIGS. 4A and 4B are time charts that correspond to transitions shown in FIGS. 3A and 3B. The on/off state of the first light source 122 of the i-th column and the third light source 132 of the i-th column are denoted by 122_*i* and 132_*i*.

Instead of turning off such a given light-emitting region as shown in FIGS. 3A and 3B, the given light-emitting region may be turned on in the second color.

Description has been made with reference to FIGS. 3A and 3B and 4A and 4B regarding an example in which the light emitting region is moved in the X direction. Also, the automotive lamp 100 is capable of moving the light emitting region in the Y direction.

Figure 6A:
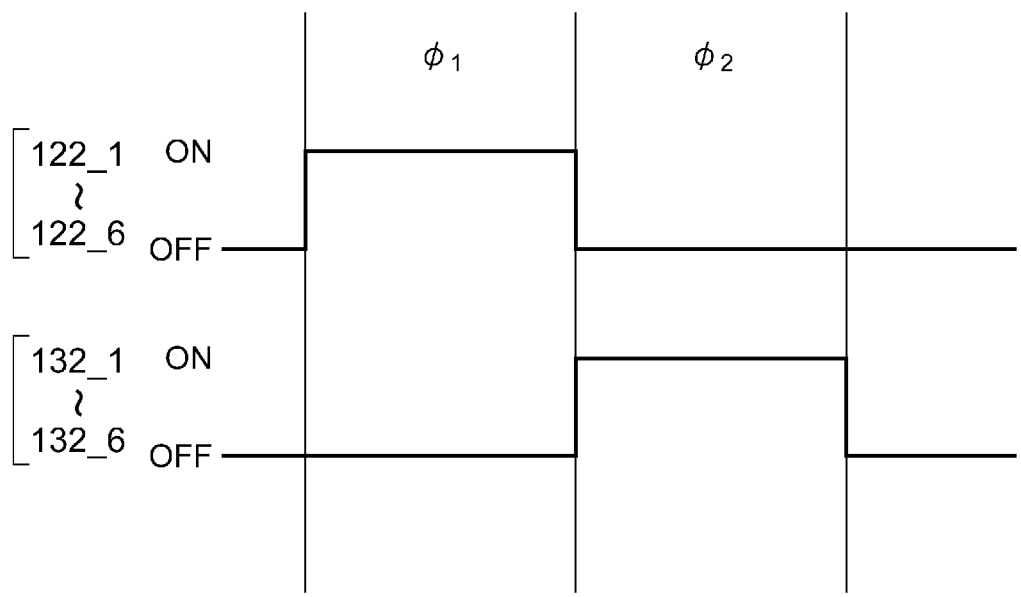
FIGS. 6A and 6B are time charts that correspond to the transitions shown in FIGS. 5A and 5B.
Figure 6B:
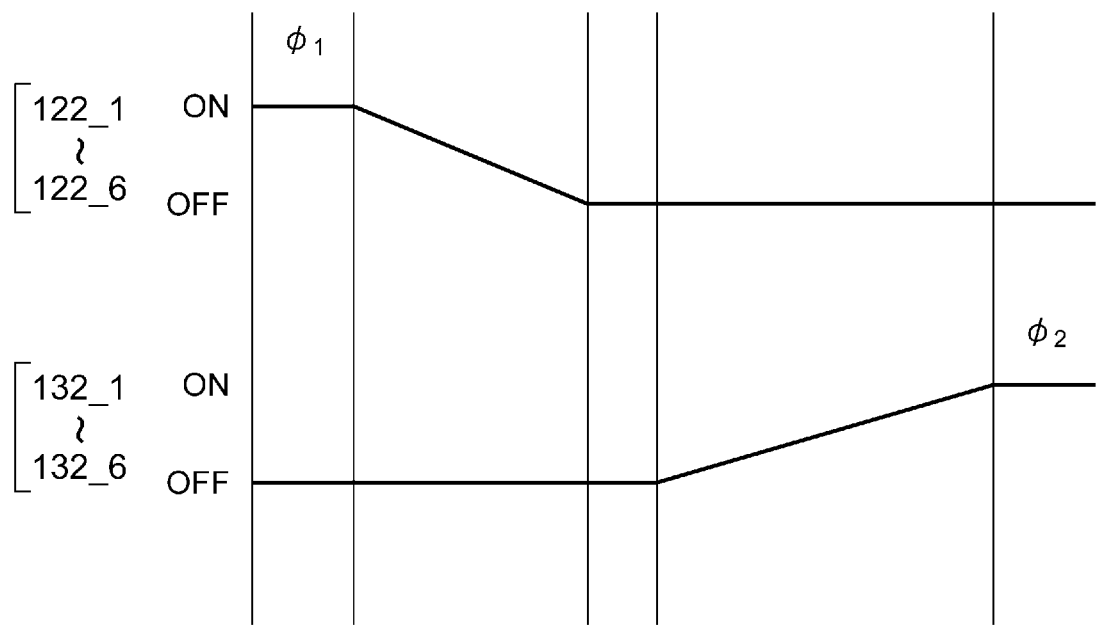

FIGS. 5A and 5B are diagrams for explaining the movement of the light-emitting region in the Y direction. FIGS. 6A and 6B are time charts that correspond to the transitions shown in FIGS. 5A and 5B.

FIG. 5A shows the transition from a first state $\phi_1$ in which the upper-half light emitting region is turned on to the second state $\phi 2$ in which the lower-half light emitting region is turned on. As shown in FIG. 6A, in the first state $\phi_1$, the first light sources 122_1 through 122_6 of the multiple first light emitting units 120 are turned on. In contrast, the multiple second light units 130 are in the turned-off state. The output light from the first light sources 122_1 through 122_6 is wave-guided downwards via the light guide unit 110. However, as the distance from the light source becomes larger, the attenuation of the luminance becomes larger. Accordingly, the luminance of the lower-side region is lower than that of the upper-side region. That is to say, only the upper-half region appears to be turned on.

In the second state $\phi_2$, the third light sources 132_1 through 132_6 of the multiple second light emitting units 130 are turned on. In contrast, the multiple first light-emitting units 120 are in the turned-off state. The output light of the third light sources 132_1 through 132_6 is wave-guided upward via the light guide unit 110. However, as the distance from the light source becomes larger, the attenuation of the luminance becomes larger. Accordingly, the luminance of the upper-side region is lower than that of the lower-side region. That is to say, only the lower-half region appears to be turned on.

The multiple first light-emitting units 120 are turned off. In contrast, the third light sources 132 of the multiple second light-emitting units 130 are turned on.

FIG. 5B shows a situation in which the state gradually transits from the first state $\phi_1$ to the second state $\phi_2$. This transition can be provided by the control shown in FIG. 6B. With the control shown in FIG. 6B, such an arrangement is capable of continuously controlling the luminance of the first light sources 122 and the third light sources 132.

Figure 7:
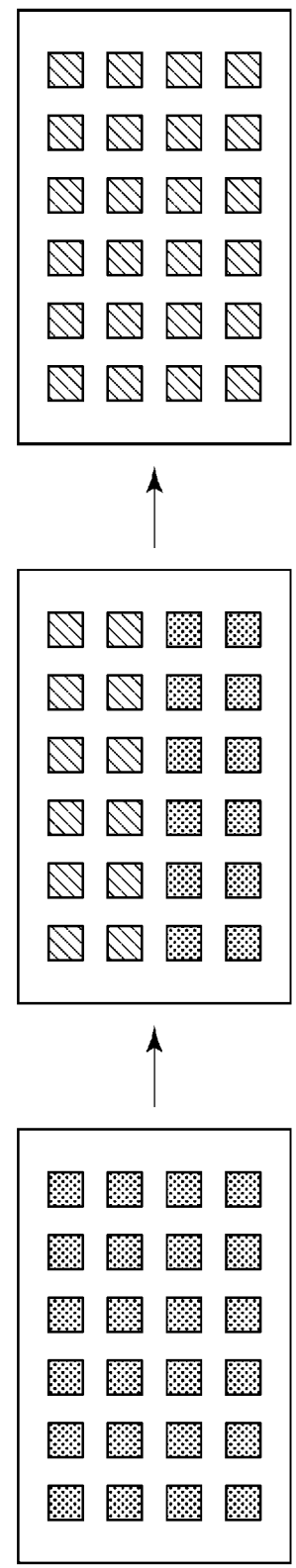
FIG. 7 is a diagram showing an example of the transition from the first-color light-emitting state to the second-color light-emitting state.
Figure 8:
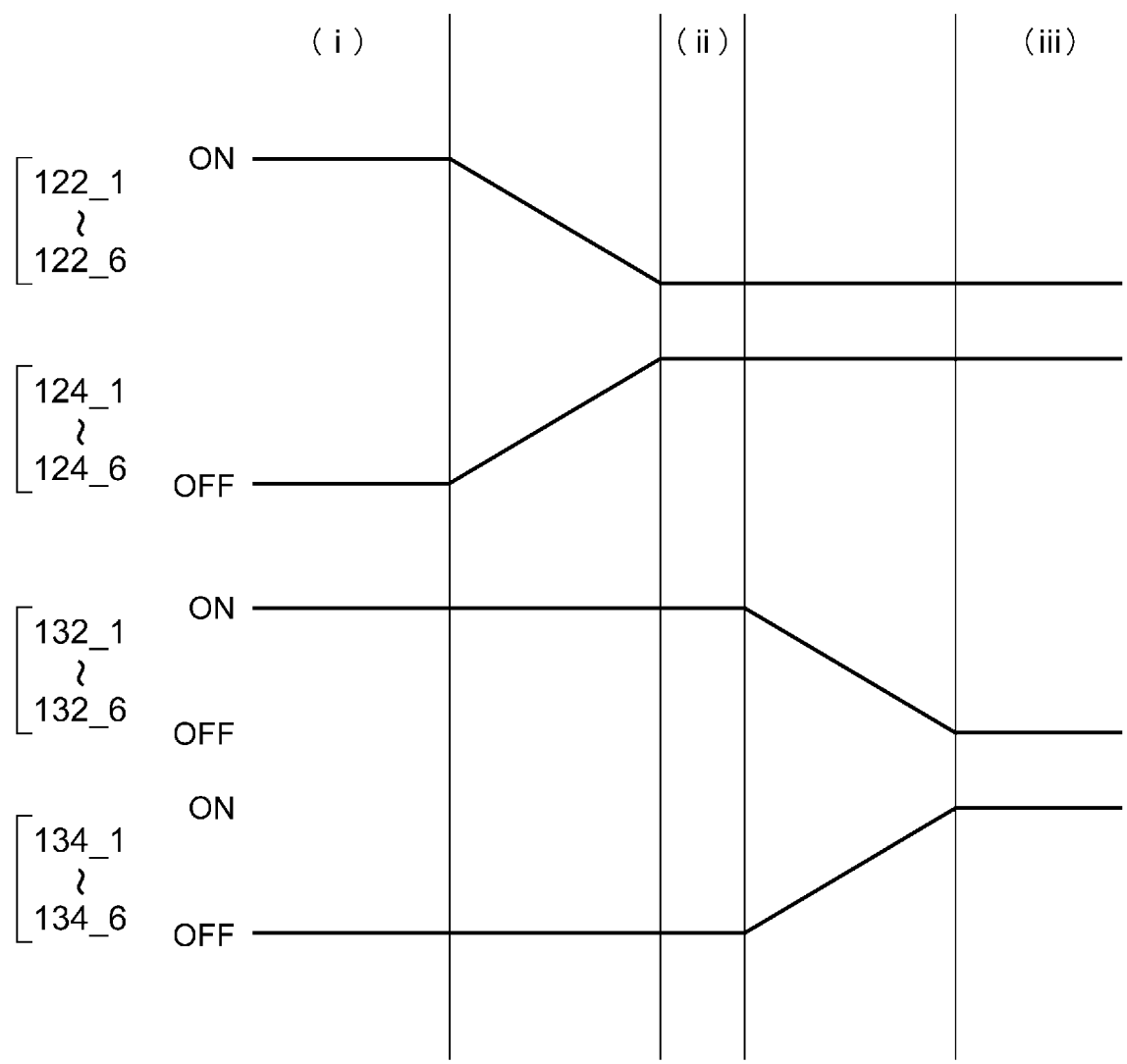
FIG. 8 is a time chart that corresponds to the transitions shown in FIG. 7.

FIG. 7 is a diagram showing an example of the transition from the first-color light-emitting state to the second-color light-emitting state. FIG. 8 is a time chart that corresponds to the transition shown in FIG. 7.

(i) First, the controller 140 instructs the first light sources 122_1 through 122_6 of the multiple first light-emitting units 120 to emit light, and instructs the third light sources 132_1 through 132_6 of the multiple second light-emitting units 130 to emit light. In this state, as shown in FIG. 7 (i), the entire panel emits light in the first color.

(ii) The controller 140 gradually reduces the luminance of the first light sources 122_1 through 122_6 of the multiple first light-emitting units 120_1 through 120_6 with time. At the same time, the controller 140 gradually increases the luminance of the second light sources 124_1 through 124_6 with time. With this, as shown in FIG. 7 (ii), the upper-half region of the panel transits from the first color to the second color.

(iii) Furthermore, the controller 140 gradually reduces the luminance of the third light sources 132_1 through 132_6 of the multiple second light-emitting units 130_1 through 130_6 with time. At the same time, the controller 140 gradually increases the luminance of the fourth light sources 134_1 through 134_6 with time. With this, the lower-half region of the panel transits from the first color to the second color. In the final stage, as shown in FIG. 7 (iii), the entire panel face becomes the second color.

Next, description will be made regarding the usage of the automotive lamp 100. The automotive lamp 100 may be mounted on a front grille of an automobile.

Figure 9:
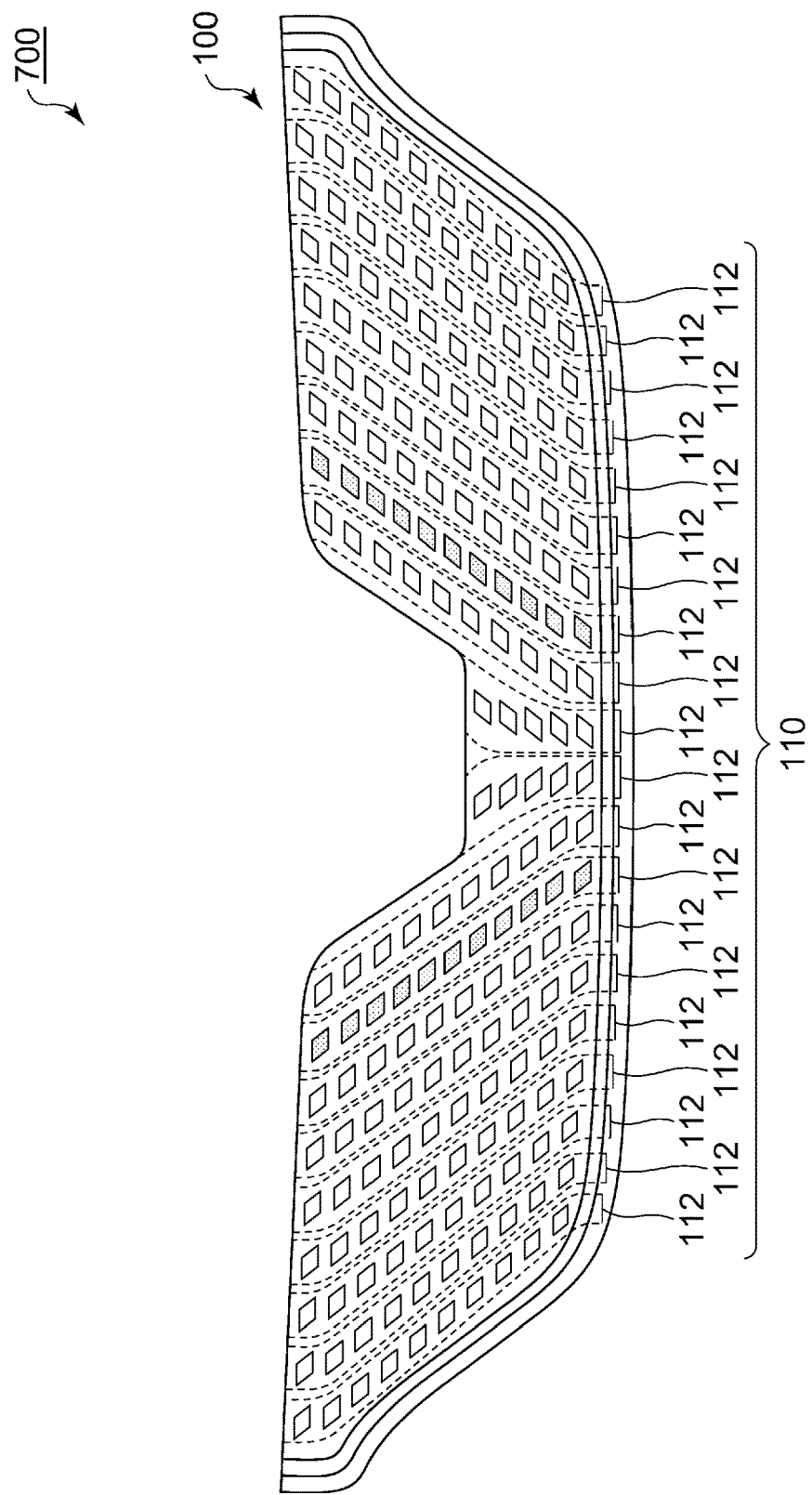
FIG. 9 is a diagram showing a front grille provided with an automotive lamp.

FIG. 9 is a diagram showing a front grille 700 provided with the automotive lamp 100. The light guide unit 110 includes multiple light guide members 112 arranged in the horizontal direction. An unshown first light-emitting unit 120 is provided to the upper-end face side of each light guide member 112. A second light-emitting unit 130 is provided to the lower-end face thereof.

In the front grille 700, white may be employed as the first color, and turquoise may be employed as the second color. The white light may be used to provide a function as a DRL, clearance lamp, or a welcome lamp. When the vehicle mounting the front grille 700 is in an autonomous driving mode, the front grille 700 is instructed to emit light in turquoise. With this, such an arrangement is capable of notifying a traffic participant in the vicinity that the vehicle is in an autonomous driving mode.

It should be noted that the shape of each of the multiple light-emitting regions of the automotive lamp 100 is not restricted to a rectangle. As shown in FIG. 9, each light-emitting region may be a parallelogram. Also, other kinds of shapes may be employed, examples of which include polygons such as triangles, pentagons, hexagons, octagons, etc. Also, circles or ellipses may be employed. The shape of each light-emitting region may be designed according to the shape of the corresponding step provided to the light guide 112. Alternatively, after rectangular steps are formed, the surface of the light guide unit 110 may be covered with an extension or a mask having recesses each corresponding to the light-emitting region.

It should be noted that, in the embodiment 1, in a case in which the light guide unit 110 has a small height, the multiple second light-emitting units 130 may be omitted.

Embodiment 2

Figure 10:
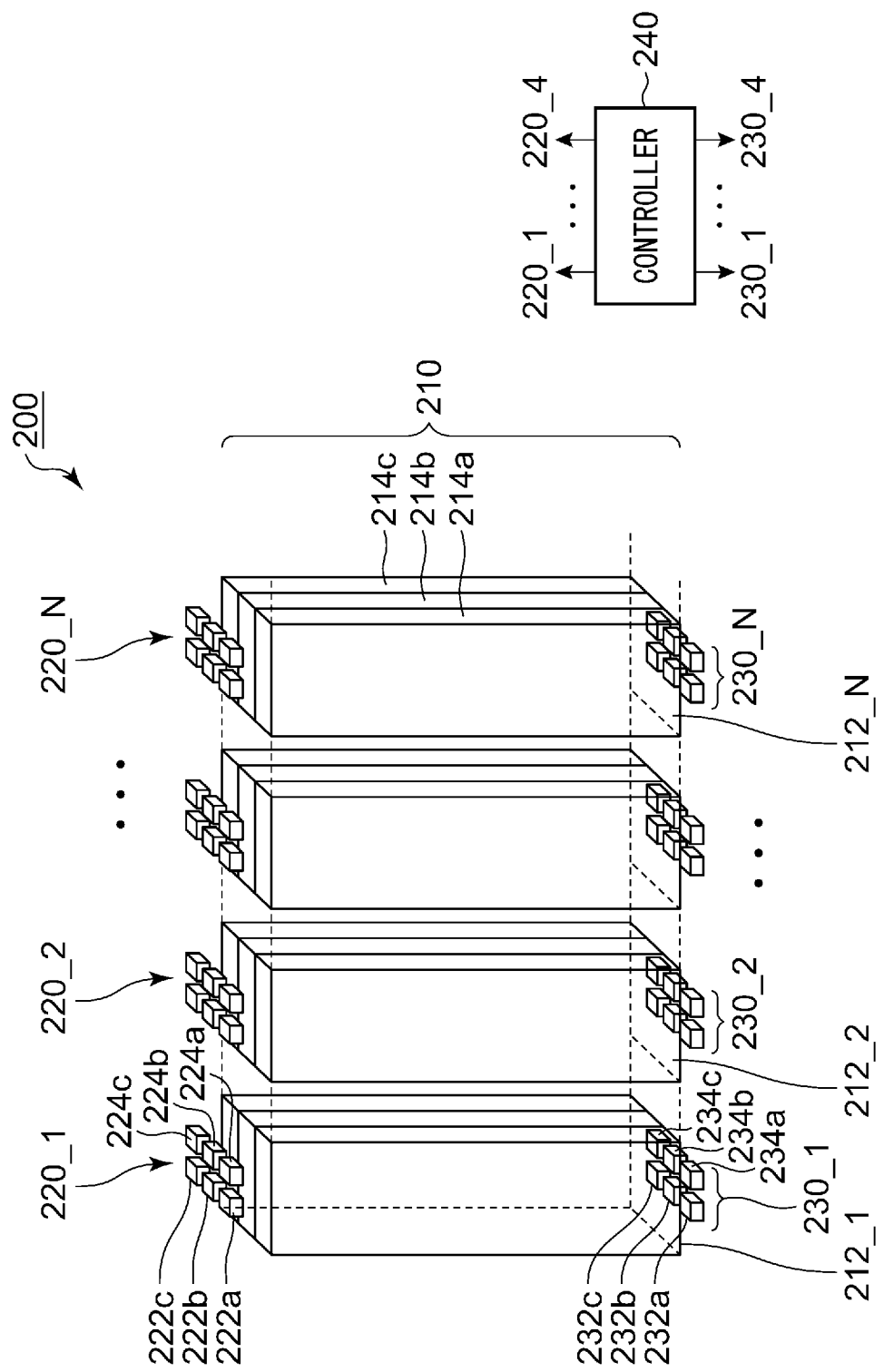
FIG. 10 is a diagram showing an automotive lamp according to an embodiment 2.

FIG. 10 is a diagram showing an automotive lamp 200 according to an embodiment 2. The automotive lamp 200 has the same basic structure as that of the automotive lamp 100 according to the embodiment 1. The automotive lamp 200 includes a light guide unit 210, multiple first light-emitting units 220, and multiple second light-emitting units 230.

As in the embodiment 1, the light guide unit 210 includes multiple light guide members 212 that correspond to the multiple light-emitting units 220 and the multiple light-emitting units 230.

In the embodiment 2, each light guide member 212 has a structure in which multiple (three, in FIG. 10) light guide plates 214a through 241c are stacked in the thickness direction.

Each first light-emitting unit 220 includes a pair of the first light source 222# and the second light source 224# for each light guide plate 214# ("#"="a" through "c"). Similarly, each second light-emitting unit 230 includes a pair of the third light source 232# and the fourth light source 234# for each light guide plate 214#.

The controller 240 is capable of independently controlling the on/off state of each of the multiple first light sources 222a through 222c and multiple second light sources 224a through 224c for each first light-emitting unit 220. Similarly, the controller 240 is capable of independently controlling the on/off state of each of the multiple third light sources 232a through 232c and multiple fourth light sources 234a through 234c for each second light-emitting unit 230.

Figure 11:
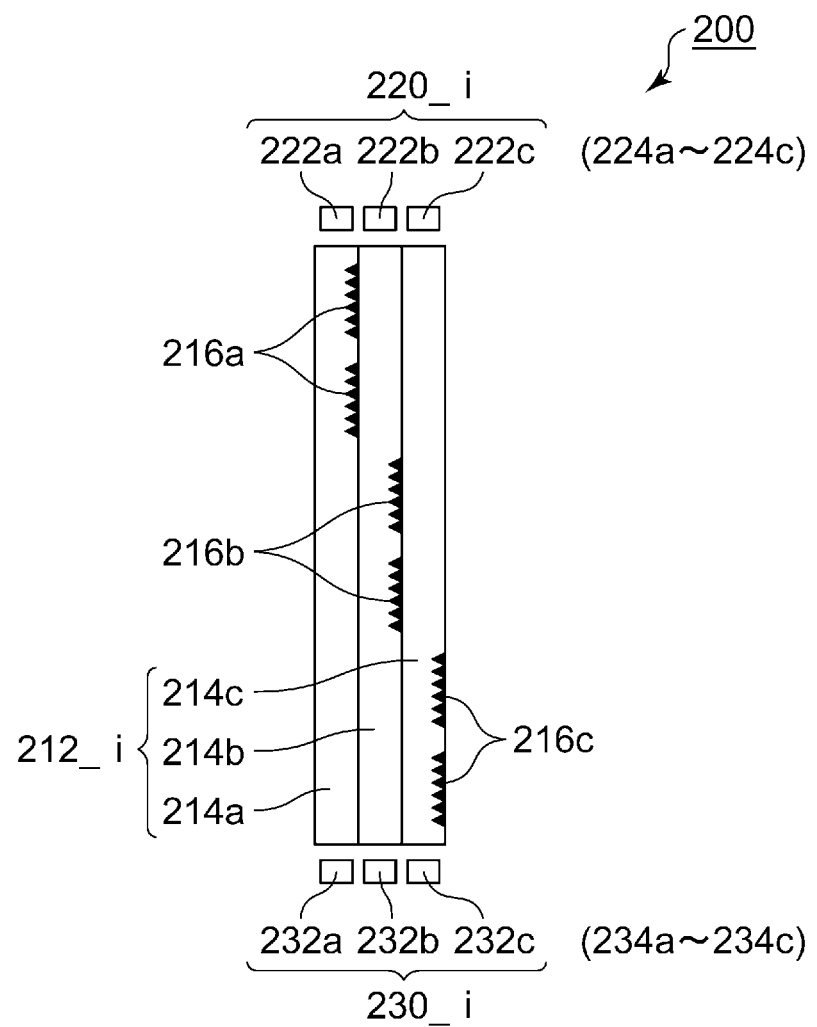
FIG. 11 is a cross-sectional diagram showing an automotive lamp.

FIG. 11 is a cross-sectional diagram showing the automotive lamp 200. Steps 216a through 216c are respectively formed in the light guide plates 214a through 214c such that they have different heights. When the second light source 224 and the fourth light source 234 that correspond to the light guide plate 214_i are turned on, the steps provided to the light guide plate 214_i emit light in the second color. In contrast, when the first light source 222 and the third light source 232 that correspond to the light guide plate 214_i are turned on, the steps provided to the light guide plate 214_i emit light in the first color.

The above is the configuration of the automotive lamp 200. With the automotive lamp 200, by controlling the turning-on/turning-off of each of the multiple first light sources 222a through 222c (232a through 232c) and each of the multiple second light sources 224a through 224c (234a through 234c) for each first light-emitting unit 220, this is capable of selecting the height of the steps to be turned on.

Embodiment 3

Figure 12:
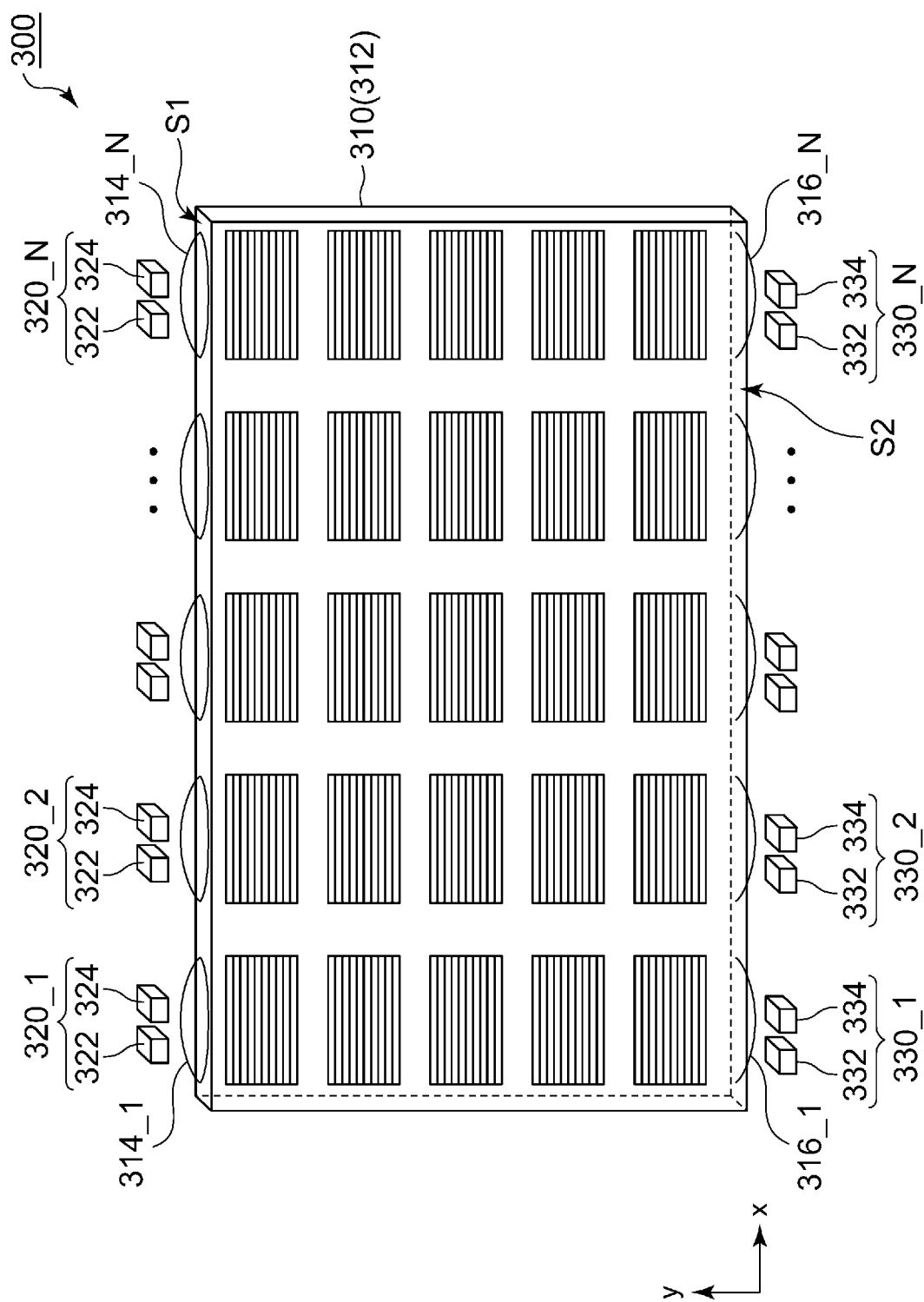
FIG. 12 is a diagram showing an automotive lamp according to an embodiment 3.

FIG. 12 is a diagram showing an automotive lamp 300 according to an embodiment 3. The automotive lamp 300 includes a light guide unit 310, multiple first light-emitting units 320, multiple second light-emitting units 330, and a controller 340. In the embodiment 3, the light guide unit 310 is configured as a single light guide panel 312.

Multiple steps are formed in the light guide panel 312 in a matrix. Furthermore, a collimating optical system 314 is provided for each first light-emitting unit 320 on the first end face S1 side of the light guide unit 310. Also, the collimating optical system may be formed together with the light guide unit 310 in the form of a single unit. As shown in FIG. 12, in a case in which the light guide unit 310 is configured as a single panel, i.e., in an arrangement in which the beams output from the adjacent light-emitting units are wave-guided via the same light guide, the collimating optical systems 314 may preferably be provided in order to limit the waveguide path for each beam. The collimating optical system 314_i collimates the output light of the corresponding first light-emitting unit 320_i into parallel light (plane wave). This allows the output light to be wave-guided in the height direction (Y direction) while suppressing beam divergence. It should be noted that, in a case in which the light guide units 110 (210) are formed as multiple separate light guide members 112 (212) as shown in FIG. 1 or 10, the beam is confined for each light guide unit. Accordingly, with such an arrangement, the collimating optical systems may be provided or omitted.

Similarly, a collimating optical system 316 is provided on the second end face S2 side of the light guide unit 310 for each second light-emitting unit 330. The collimating optical system 316_i collimates the output light of the corresponding second light-emitting unit 330_i into parallel light (plane wave). This allows the output light to be guided within the light guide unit 310 while suppressing beam divergence.

The collimating optical systems 314 and 316 may be configured as protruding members provided on the first end face S1 and the second end face S2 of the light guide unit 310.

By appropriately designing the collimating optical systems 314 and 316, this is capable of guiding the output light of the multiple first light-emitting units 320 without interference between them within the light guide panel 312.

It should be noted that, in the automotive lamp 300 shown in FIG. 12, the multiple second light-emitting units 330 and the multiple collimating units 316 may be omitted.

Figure 13:
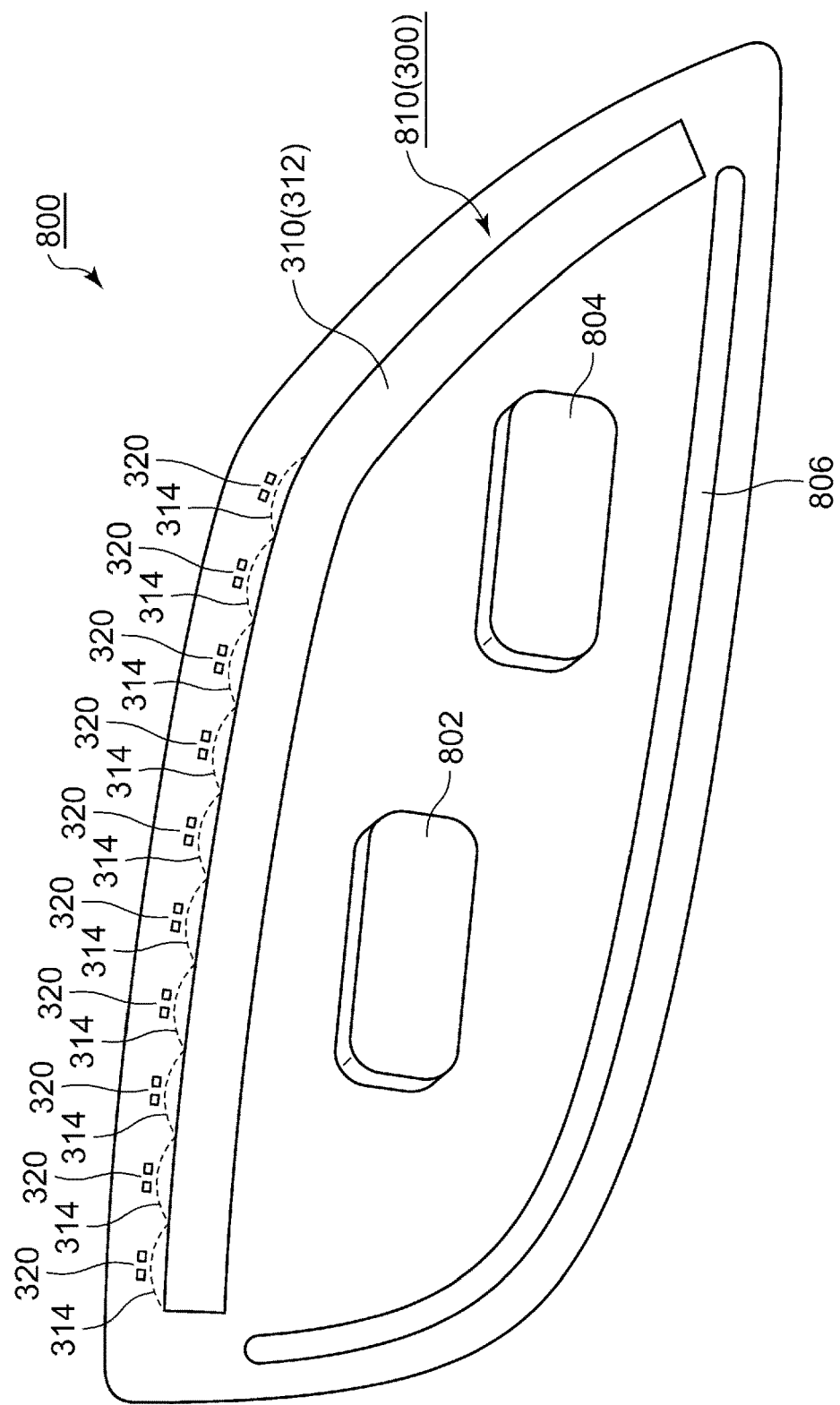
FIG. 13 is a diagram showing a headlamp provided with an automotive lamp.

Next, description will be made regarding the usage of the automotive lamp 300. FIG. 13 is a diagram showing a headlamp 800 provided with the automotive lamp 300. The headlamp 800 includes a low-beam lamp 802, a high-beam lamp 804, a clearance lamp 806, and a turn/ADS lamp 810. The clearance lamp 806 may serve as a DRL lamp.

The turn/ADS (Automated Driving System) lamp 810 is configured as the automotive lamp 300. When the turn/ADS lamp 810 functions as a turn lamp, the turn/ADS lamp 810 emits amber light. On the other hand, when the turn/ADS lamp 810 functions as an ADS lamp, the turn/ADS lamp 810 emits turquoise light. Accordingly, the automotive lamp 300 is designed with an amber color as the first color, and with a turquoise color as the second color.

In FIG. 13, a continuous step may be formed over the entire face of the light guide panel 312. Also, as shown in FIG. 12, steps may be made in a matrix. Alternatively, steps may be formed with one row and N columns.

Figure 14:
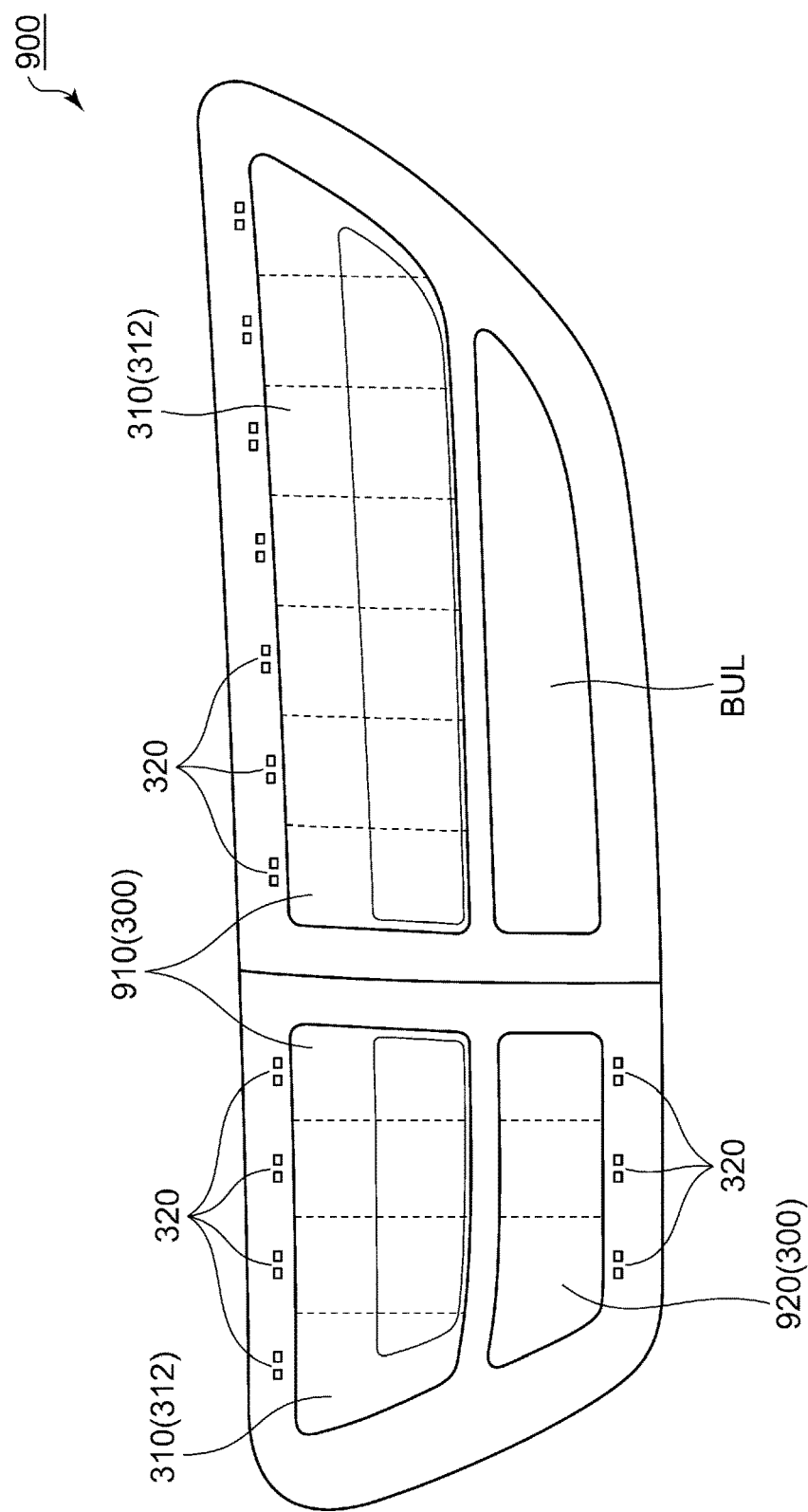
FIG. 14 is a diagram showing a rear combination lamp provided with an automotive lamp.

FIG. 14 is a diagram showing a rear combination lamp 900 provided with the automotive lamp 300. The rear combination lamp 900 includes a tail/ADS lamp 910 and a turn/ADS lamp 920.

The tail/ADS lamp 910 and the turn/ADS lamp 920 are each configured as the automotive lamp 300 shown in FIG. 12. When the tail/ADS lamp 910 functions as a tail lamp, the tail/ADS lamp 910 emits red light. On the other hand, when the tail/ADS lamp 910 functions as an ADS lamp, the tail/ADS lamp 910 emits turquoise light. Accordingly, the tail/ADS lamp 910 is designed with red as the first color and with turquoise as the second color.

When the turn/ADS lamp 920 functions as a turn lamp, the turn/ADS lamp 920 emits amber light. On the other hand, when the turn/ADS lamp 920 functions as an ADS lamp, the turn/ADS lamp 920 emits turquoise light. Accordingly, the turn/ADS lamp 920 is designed with an amber color as the first color, and with a turquoise color as the second color.

Description has been made regarding the present disclosure with reference to the embodiments using specific terms. However, the above-described embodiments show only an aspect of the mechanisms and applications of the present invention. Rather, various modifications and various changes in the layout can be made without departing from the spirit and scope of the present disclosure defined in appended claims.

What is claimed is:

1. An automotive lamp comprising:
a light guide unit;
a plurality of first light-emitting units arranged along a first end face of the light guide unit, and each of the plurality of first light-emitting units comprises a first light source structured to emit light in a first color and a second light source structured to emit light in a second color that differs from the first color;
a controller structured to control the plurality of first light-emitting units; and
a plurality of second light-emitting units arranged along a second end face of the light guide unit on a side opposite to the first end face thereof, wherein
each of the plurality of second light-emitting units comprises a third light source structure to emit light in the first color and a fourth light source structured to emit in the second color.

2. The automotive lamp according to claim 1, wherein the light guide unit comprises a plurality of light guide members that correspond to the plurality of first light-emitting units, and each of the plurality of light guide members extends with a corresponding one of the plurality of first light-emitting units as a start point.

3. The automotive lamp according to claim 1, wherein the light guide unit comprises a plurality of light guide members that correspond to the plurality of first light-emitting units and the plurality of second light-emitting units, and each of the plurality of light guide members extends from a corresponding one from among the plurality of first light-emitting units toward a corresponding one from among the plurality of second light-emitting units.

4. The automotive lamp according to claim 2, wherein a plurality of discrete steps are formed in the plurality of light guide members along a direction of extension thereof.

5. The automotive lamp according to claim 3, wherein a plurality of discrete steps are formed in the plurality of light guide members along a direction of extension thereof.

6. The automotive lamp according to claim 3, wherein the controller is configured to control an operation such that (i) the first light sources included in the plurality of first light-emitting units are turned on, and the third light sources included in the plurality of second light-emitting units are turned on, (ii) luminance of the first light sources included in the plurality of light-emitting units is gradually reduced with time, and at the same time, luminance of the second light sources is gradually increased with time, and (iii) luminance of the third light sources included in the plurality of second light-emitting units is gradually reduced with time, and at the same time, luminance of the fourth light sources is gradually increased with time.

7. The automotive lamp according to claim 1, wherein the light guide unit is structured as a single light guide panel, and wherein a collimating optical system is provided to or formed on the first end face of the light guide panel for each of the first light-emitting units.

8. The automotive lamp according to claim 1, wherein the controller is configured to control an operation such that (i) the first light sources included in the plurality of first light-emitting units are turned on, and the third light sources included in the plurality of second light-emitting units are turned on, (ii) luminance of the first light sources included in the plurality of light-emitting units is gradually reduced with time, and at the same time, luminance of the second light sources is gradually increased with time, and (iii) luminance of the third light sources included in the plurality of second light-emitting units is gradually reduced with time, and at the same time, luminance of the fourth light sources is gradually increased with time.

9. The automotive lamp according to claim 1, wherein the light guide unit has a stacked structure,
   wherein layers of the stacked structure have respective steps having different heights,
   and wherein the first light-emitting unit is provided with a pair of the first light source and the second light source for each layer of the stacked structure.

10. The automotive lamp according to claim 1, wherein one from among the first color and the second color is turquoise.

11. The automotive lamp according to claim 1, mounted on a front grille of a vehicle.

12. The automotive lamp according to claim 1, mounted on a headlamp or a rear combination lamp.

* * * * *